United States Patent [19]

Brennan et al.

[11] 4,324,843

[45] Apr. 13, 1982

[54] CONTINUOUS LENGTH SILICON CARBIDE FIBER REINFORCED CERAMIC COMPOSITES

[75] Inventors: John J. Brennan, Portland; Karl M. Prewo, Vernon, both of Conn.

[73] Assignee: United Technologies Corporation, Hartford, Conn.

[21] Appl. No.: 121,081

[22] Filed: Feb. 13, 1980

[51] Int. Cl.³ .................... B32B 5/02; B32B 5/08; B32B 15/08

[52] U.S. Cl. .................... 428/697; 428/107; 428/112; 428/114; 428/294; 428/367; 428/698; 428/902

[58] Field of Search .............. 428/367, 902, 294, 107, 428/112, 114, 697, 698

[56] References Cited

U.S. PATENT DOCUMENTS

| | | | |
|---|---|---|---|
| 3,161,473 | 12/1964 | Pultz . | |
| 3,386,840 | 6/1968 | Gruber | 106/44 |
| 3,653,851 | 4/1972 | Gruber | 106/44 |
| 3,892,583 | 7/1975 | Winter et al. | 106/44 |

*Primary Examiner*—James C. Cannon
*Attorney, Agent, or Firm*—Harry J. Gwinnell

[57] ABSTRACT

A silicon carbide fiber reinforced ceramic matrix composite is disclosed having high strength, fracture toughness, and oxidative stability even at high temperature use. The composite is made up of a plurality of ceramic layers, each layer reinforced with a plurality of unidirectional continuous length silicon carbide fibers, each layer having an axial flexural strength greater than 70,000 psi and a high fracture toughness, exemplified by a critical stress intensity factor greater than $10 \times 10^3$ psi (inch)$^{\frac{1}{2}}$. The composite is formed by starting with the ceramic matrix material in the glassy state and converting it from the glassy state to the ceramic state after densification of the composite.

8 Claims, 2 Drawing Figures

Unidirectional

50μ

0°/90° Cross-plied

100μ

CONTINUOUS LENGTH SILICON CARBIDE FIBER REINFORCED CERAMIC COMPOSITES

The Government has rights in this invention pursuant to Contract No. N00014-78-C-0503 awarded by the Department of the Navy.

CROSS REFERENCE TO RELATED APPLICATION

Commonly assigned, copending application Ser. No. 147,672, filed May 7, 1980 is directed to silicon carbide fiber reinforced glass composites.

TECHNICAL FIELD

The field of art to which this invention pertains is fiber reinforced composites.

BACKGROUND ART

Because of the scarcity and increasing expense of many conventional high temperature structural metals, increased attention has focused on nonmetal containing composites as replacements for conventional high temperature metal-containing materials. Use of metal replacement high strength fiber reinforced resin and even high strength fiber reinforced metal matrix composites has progressed to the point of commercial acceptance in products ranging from sporting goods to advanced jet aircraft components. One of the big problems with these composites, however, has been their maximum use temperature. And while great strides have been made in raising the use temperatures, for example by utilizing such composites as graphite fiber reinforced glass and alumina fiber reinforced glass, there is still much room for improvement. For example, while the graphite fiber reinforced glass composite demonstrates high levels of strength, fatigue resistance, and fracture toughness, it is also susceptible to detrimental fiber oxidation at elevated temperatures. And while composites such as alumina fiber reinforced glass are oxidatively stable at high temperatures, the overall strength and toughness levels attainable with these composites is less than that possible with a graphite reinforced glass system for example. Accordingly, what is needed in the art is a composite with high strength, high fracture toughness, and oxidation stability at high temperatures.

DISCLOSURE OF INVENTION

The present invention is directed to a solution to the high strength, fracture toughness, and oxidative stability problems which exist with composites of the prior art and comprises a multi-layer, fiber reinforced ceramic composite made up of a plurality of ceramic layers, each layer reinforced with a plurality of unidirectional, continuous length silicon carbide fibers, each layer having an axial flexural strength greater than 70,000 psi and a high fracture toughness, exemplified by a critical stress intensity factor greater than $10 \times 10^3$ psi (inch)$^{\frac{1}{2}}$.

BEST MODE FOR CARRYING OUT THE INVENTION

Figure 1:
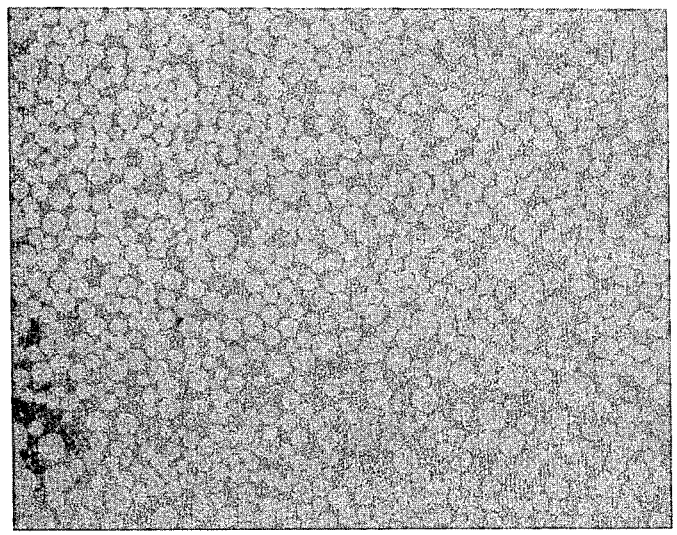
FIG. 1 shows in cross section an actual, uniaxial SiC fiber reinforced ceramic matrix composite.

A glass, which can be converted to a ceramic, is the ideal matrix material to form the composites of the present invention. During composite densification the matrix is retained in the glassy state, thus avoiding fiber damage and promoting densification under low applied pressure. After densification to the desired fiber plus matrix configuration, the glassy matrix can be converted to the crystalline state, the degree and extent of crystallization being controlled by the matrix composition and heat treatment schedule employed. A wide variety of glasses could be used in this manner, however, a strict limitation on the amount and activity of titanium present in the glass is of controlling importance. Accordingly, if titania nucleating agents are used, they must be inactivated or kept below one percent by weight. This can be accomplished by simply substituting another nucleating agent such as zirconia for the conventional titania or adding an agent, such as lead, to mask the reactivity of the titania toward the silicon carbide fiber. However, in any case it is necessary to either eliminate or mask the effects of the titania on the silicon carbide fiber to attain a composite with the improved properties disclosed. This problem is believed attributable to the reactivity of the titanium to the silicon carbide fiber. And while conventional lithium alumino-silicate is the preferred glass ceramic, other conventional glass ceramics such as alumino-silicate, magnesium alumino-silicate, and combinations of the above can be used as long as the ceramic matrix material is titanium free. By titanium free is meant that the composition contains less than about 1% by weight titanium or additional components (such as lead) which either mask or inactivate the reactivity of the titanium toward the SiC fibers. It has also been found that the reactivity of the titanium and its adverse composite effects can be lessened by a combination of decreased titania nucleating agent concentration and lower hot pressing temperatures—e.g., a glass ceramic composition with less than 2% by weight titania, hot pressed at temperatures below about 1100° C. And, as stated above, $ZrO_2$ is a preferred substitute for the titania nucleating agent in amounts up to about 5% by weight, producing no adverse effects on the composite properties. Other nucleating agents may also be successful substitutes for the titania. It should also be noted that in general the starting glass ceramic material can be obtained in the glassy state in powder form. If however, the ceramic material is obtained in crystalline form, it will be necessary to melt the material to form it into the glassy state, solidify it and subsequently crush it into powder form, preferably about $-325$ mesh. An important part of the invention is to select glass ceramic matrix material such as that described above which can be densified (in combination with the SiC fibers) in the glassy state with a viscosity low enough to permit complete densification with subsequent transformation into a substantially complete crystalline state providing a composite with a use temperature in excess of 1000° C. It is also possible to convert the starting crystalline powder to the glassy state during preheat treatment prior to application of pressure for densification.

While any silicon carbide fiber system with the requisite strength can be used, a multifilament silicon carbide yarn with an average filament diameter up to 50 microns is preferred and yarn with average filament diameter of 5-15 microns especially preferred. Nippon Carbon Co. of Japan produces such a yarn with about 250 fibers per tow and an average fiber diameter of about 10 microns. The average strength of this fiber is approximately 2000 MPa (300 Ksi), and it has a use temperature of up to 1500° C. The yarn has a density of approximately 2.7 gm. per cc and an elastic modulus of approximately 221 GPa ($32 \times 10^6$ psi).

The method of forming the composite is also important for obtaining the improved properties described. The ceramic constituents are generally obtained in powder form (preferably about −325 mesh) in the glassy state (noncrystalline form) and are combined in this powder state with the silicon carbide fibers by hot press consolidation. After densification, the composite is held for a time and at a temperature sufficient to transform the noncrystalline ceramic into the crystalline state by controlled nucleation and growth of the appropriate crystalline phases. The composite articles are preferably formed by laying up layers containing continuous silicon carbide fibers and the powdered ceramic. The articles formed are then hot pressed at elevated temperatures to form the composite. The processing parameters and composition of the material can vary widely depending on the ultimate use of the article. The preferred method for forming the articles of the present invention is by hot pressing the mixture of silicon carbide fibers and noncrystalline ceramic powder as mentioned above. This method gives particular design flexibility in orienting the fibers, and sheets formed by such method are particularly adapted to hot pressing into desired shapes. An exemplary method comprises continuously unwinding a tow of silicon carbide fibers (yarn) from a spool at a moderate rate of speed and passing such fibers through a slip of the powdered ceramic, solvent and plasticizer to impregnate the tow. The impregnated fibers are then rewound onto a larger rotating spool. An exemplary slip composition may be composed of 40 gm. of powdered glass ceramic and 780 ml. of propanol. An alternative composition may comprise 85 gm. of the glass ceramic and 200 gm. of propanol, 10 gm. of polyvinyl alcohol and 5 drops (approximately 1 cc.) of a wetting agent such as Tergitol ®. The receiving drum is preferably run at one revolution per minute or linear speed of 5 ft. per minute. Excess glass ceramic and solid can be removed by pressing a squeegee against the drum as it winds. Preferably the ground ceramic is sized so that 90% of it passes through a −325 mesh sieve. The thus impregnated tape is then dried either at ambient temperature or with a radiant heat source to remove solvent.

Following impregnation, the fiber is removed from the drum and cut into strips to conform to the dimensions of the article to be fabricated. The fibers are then laid up in alternating ply stacks in any sequence desired, e.g., each layer unidirectional, alternating plys of 0° and 90°, or 0°/30°/60°/90°, 0°/±45°/90°, etc. In a key processing step the assembled composite is then hot pressed either under vacuum or inert gas such as argon in metal dies coated with colloidal boron nitride or graphite dies sprayed with boron nitride powder at pressures of 6.9-13.8 MPa (1000-2000 psi) and temperatures of 1100°-1550° C. Time of hot pressing will vary depending on composite makeup but generally will be accomplished between about 10 minutes and 1 hour. Additional glass also in powder form may be inserted between each layer as it is laid. SiC fiber loading in the composite is preferably at least about 50% by volume.

The mold can also be vibrated to ensure uniform distribution of the ceramic powder over the laid fiber surfaces. Processing by starting with the matrix material in the glassy state to permit composite densification by hot pressing, followed by converting the ceramic into the crystalline state largely contributes to the superior properties of the resulting composite. If after hot pressing any significant portion of the ceramic matrix material is found to be in the glassy state, further heat treatment may be necessary to substantially completely crystallize the matrix for optimum high temperature performance. And although it is preferred to have the ceramic matrix material in the fully ceramic state, acceptable composite properties are attainable even if some of the ceramic matrix is retained in the composite in the glassy state, e.g., up to 25% by weight.

Based on the composition of the matrix material, the particular fiber reinforcement, and the process of forming the composite, an article with exceptional high strength, fracture toughness, and oxidation resistance especially at high temperatures is obtained. Each fiber reinforced layer of the composite regardless of the number of layers or orientation has an axial flexural strength greater than 70,000 psi and in some instance greater than 100,000 psi. As for fracture toughness, each layer has a critical stress intensity factor greater than $10 \times 10^3$ psi (inch)$^{\frac{1}{2}}$. This is clearly superior to any known ceramic matrix composite currently available, especially with the low density and oxidation resistance at high temperatures exhibited by the composites of the present invention. An indication of this oxidation resistance can be seen from the data in Table I.

TABLE I

Bend strength (3-pt) in Air vs. Temperature for SiC Yarn/Lithium Aluminosilicate Composites (50 SiC).
Volume Percent Bend Strength (Ksi)

| Temp. °C. | Unidirectional Composite | 0°/90° Cross-plied Composite |
|---|---|---|
| 20 | 90 | 50 |
| 600 | 100 | 60 |
| 800 | 120 | 70 |
| 1000 | 140 | 70 |
| 1100 | 90 | 70 |
| 1200 | 40 | 40 |

From Table I, it can be seen that the composites of the present invention exhibit excellent flexural strengths in an oxidizing environment well in excess of 1000° C. It is also felt that based on the type of matrix employed, these strengths can be maintained over 1300° C. It should be noted that while each individual layer will have an axial flexural strength greater than 70,000 psi the overall composite could have a flexural strength of a lesser value. A uniaxially fiber oriented composite would have an overall axial flexural strength greater than 70,000 psi however, while each individual layer in a 0°/90° multiaxially oriented lay-up of individual fiber layers would have an axial flexural strength greater than 70,000 psi. The composite would have a flexural strength of greater than 35,000 psi because half the fibers would not be in the principal test direction. However, such composite would have better overall strength and impact resistance than, say a totally uniaxially composite because of the multiaxial orientation of the fibers. Such multiaxially oriented fiber composites can be impacted with significant velocity without fracture, unlike conventional monolithic ceramic articles.

Figure 2:
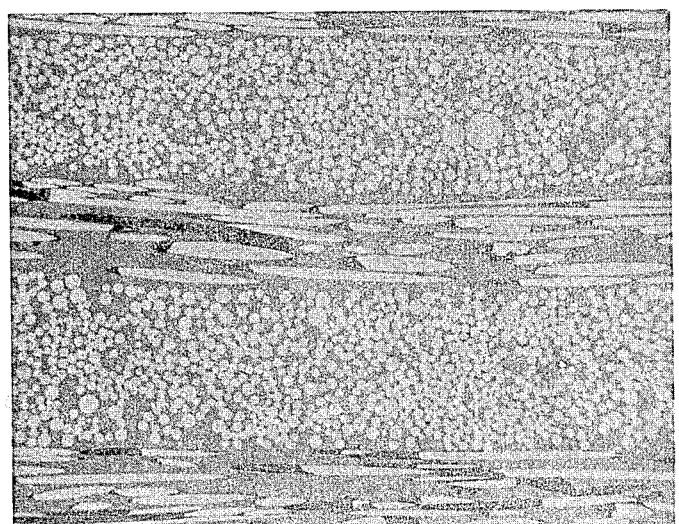
FIG. 2 shows in cross section an actual multiaxial SiC fiber reinforced ceramic matrix composite.

By unidirectional is meant all the SiC fibers are oriented in each individual layer in substantially the same axial direction ($\pm 5°$). By uniaxial is meant that each layer in the composite is oriented such that all the unidirectionally laid fibers in all layers are oriented in substantially the same axial direction ($\pm 5°$). Note FIG. 1 which demonstrates an actual sectional view of a composite containing a plurality of unidirectionally laid SiC fibers in a lithium aluminosilicate ceramic (LAS) matrix where the composite layers are uniaxially oriented; and FIG. 2 which demonstrates an actual sectional view of a SiC fiber—lithium aluminosilicate ceramic matrix containing a plurality of unidirectional fiber layers which are multiaxially oriented in the composite—in this case oriented in an alternating 0°/90° multiaxial orientation.

The fracture toughness of this composite system has also been measured using a notched beam test with unidirectionally reinforced samples exhibiting critical stress intensity factor ($K_{IC}$) values of $19 \times 10^3$ psi (in.)$^{\frac{1}{2}}$ at RT, (room temperature) $24 \times 10^3$ psi (in.)$^{\frac{1}{2}}$ at 800° C., $27 \times 10^3$ psi (in.)$^{\frac{1}{2}}$ at 1000° C., and $18 \times 10^3$ psi (in.)$^{\frac{1}{2}}$ at 1100° C. These values are only slightly less than some aluminum alloys possess. Even the cross-plied (0°/90°) LAS/SiC yarn composites exhibit $K_{IC}$ values of over $11 \times 10^3$ psi (in.)$^{\frac{1}{2}}$ from RT to 1100° C. Monolithic Corning 9608 lithium aluminosilicate, on the other hand, has very low fracture toughness with a $K_{IC}$ of approximately $1.3 \times 10^3$ psi (in.)$^{\frac{1}{2}}$ from RT to 1000° C.

It is particularly noteworthy that, even after initial fracture, composites of the present invention retain a substantial fraction of their original untested strength. This resistance to fracture, even in the presence of initiated damage, is distinctly different from the brittle nature of conventional ceramic articles.

The reinforced ceramics of the present invention have particular utility in environments where oxidation resistance, high strength and toughness are required and are especially adaptable to such properties in a high temperature environment (e.g., in excess of 1000° C. and even, with additional matrix modification, in excess of 1200° C.) such as in a gas turbine engine or internal combustion engine environment and in high temperature structural ceramic components.

Although this invention has been shown and described with respect to a preferred embodiment, it will be understood by those skilled in this art that various changes in form and detail thereof may be made without departing from the spirit and scope of the claimed invention.

We claim:

1. A multilayered fiber reinforced ceramic composite comprising a plurality of substantially titanium-free ceramic layers selected from the group consisting of (a) aluminosilicate, (b) lithium aluminosilicate, (c) magnesium aluminosilicate and (d) mixtures thereof, each layer reinforced with a plurality of unidirectional, continuous length silicon carbide fibers, each layer having an axial flexural strength greater than 70,000 psi ($4.83 \times 10^8$ NT/M$^2$) and a high fracture toughness, exemplified by a critical stress intensity factor greater than $10 \times 10^3$ psi (inch)$^{\frac{1}{2}}$.

2. The composite of claim 1 wherein the silicon carbide fiber containing layers are uniaxially oriented.

3. The composite of claim 1 wherein the silicon carbide fiber containing layers are multiaxially oriented.

4. The composite of claims 2 or 3 wherein the silicon carbide fibers comprise a multifilament silicon carbide yarn with an average filament diameter of up to 50 microns.

5. The composite of claim 4 wherein the yarn has an average filament diameter of 5–15 microns.

6. The composite of claims 2 or 3 wherein the silicon carbide fibers are present in an amount of at least about 40% by volume.

7. The composite of claim 2 wherein the fibers are oriented in 0°/90°, 0°/$\pm$45°/90°, or 0°/30°/60°/90° orientation.

8. The composite of claims 1, 2 or 3 wherein the composite is formed by starting with the ceramic in the glassy state and converting it from the glassy state to the ceramic state after densification of the composite.

* * * * *